(12) United States Patent
Nakatani

(10) Patent No.: US 11,546,356 B2
(45) Date of Patent: ***Jan. 3, 2023

(54) THREAT INFORMATION EXTRACTION APPARATUS AND THREAT INFORMATION EXTRACTION SYSTEM

(71) Applicant: Nippon Telegraph and Telephone Corporation, Tokyo (JP)

(72) Inventor: Yuichi Nakatani, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 228 days.

This patent is subject to a terminal disclaimer.

(21) Appl. No.: 16/968,974

(22) PCT Filed: Feb. 8, 2019

(86) PCT No.: PCT/JP2019/004586
§ 371 (c)(1),
(2) Date: Aug. 11, 2020

(87) PCT Pub. No.: WO2019/159833
PCT Pub. Date: Aug. 22, 2019

(65) Prior Publication Data
US 2021/0058411 A1   Feb. 25, 2021

(30) Foreign Application Priority Data
Feb. 15, 2018 (JP) .............................. JP2018-025426

(51) Int. Cl.
*H04L 9/40*   (2022.01)

(52) U.S. Cl.
CPC ...... *H04L 63/1416* (2013.01); *H04L 63/1425* (2013.01)

(58) Field of Classification Search
CPC .. H04L 63/1416; H04L 63/1425; G06F 21/55
(Continued)

(56) References Cited

U.S. PATENT DOCUMENTS 7,500,266 B1 * 3/2009 Vukelich ............. H04L 63/1416
   726/23
7,624,447 B1 * 11/2009 Horowitz ............ H04L 63/0263
   726/23
(Continued)

FOREIGN PATENT DOCUMENTS

JP  2009181335   8/2009
JP   201092236   4/2010
(Continued)

OTHER PUBLICATIONS

Adachi, "Host-Based Early Detection Method for Remote Access Trojan (RAT)," Computer Security Symposium, Oct. 2015, 2015(3):1111-1118. 19 pages (with English Translation).

*Primary Examiner* — Badri Narayanan Champakesan
(74) *Attorney, Agent, or Firm* — Fish & Richardson P.C.

(57) ABSTRACT

The present invention discloses a technique for extending threat information and/or generating new threat information by analyzing packet headers flowing through a network using threat information obtained by analyzing malware behavior or the like. An aspect of the present invention relates to a threat information extraction device provided with a network information DB that stores flow information and a threat information extraction unit that extracts new threat information from acquired threat information using the flow information, in which the threat information extraction unit extracts a first IP address from the acquired threat information, creates totalization information on the first IP address from the flow information, estimates a feature value of communication associated with the first IP address from the totalization information, extracts zero or one or more other IP addresses similar to the first IP address at which communication is in progress based on the estimated feature value and generates threat information.

13 Claims, 9 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 7,661,136 | B1* | 2/2010 | Spielman | ................ H04L 43/00 |
| | | | | 726/22 |
| 7,823,202 | B1* | 10/2010 | Nucci | .................... H04L 45/00 |
| | | | | 709/224 |
| 9,661,003 | B2* | 5/2017 | Parker | ................ H04L 63/1408 |
| 10,574,695 | B2* | 2/2020 | Jeng | ........................ H04L 63/14 |
| 10,681,060 | B2* | 6/2020 | Scheidler | ............... G06N 20/00 |
| 10,721,244 | B2* | 7/2020 | Chiba | .................... G06F 21/55 |
| 2008/0301812 | A1* | 12/2008 | Chow | ................ H04L 63/1416 |
| | | | | 726/24 |
| 2012/0260340 | A1* | 10/2012 | Morris | ................. H04L 63/145 |
| | | | | 709/202 |
| 2015/0033343 | A1* | 1/2015 | Jiang | .................. H04L 63/1416 |
| | | | | 726/23 |
| 2015/0207809 | A1* | 7/2015 | MacAulay | ............ G06F 21/552 |
| | | | | 726/22 |
| 2016/0164886 | A1* | 6/2016 | Thrash | ................ H04L 63/1441 |
| | | | | 726/23 |
| 2016/0226902 | A1* | 8/2016 | Kohout | ............... H04L 63/1491 |
| 2016/0366159 | A1* | 12/2016 | Chiba | ................ H04L 63/1458 |
| 2017/0078312 | A1* | 3/2017 | Yamada | ............. H04L 63/1416 |
| 2018/0219879 | A1* | 8/2018 | Pierce | ................ H04L 63/1416 |
| 2018/0309772 | A1* | 10/2018 | Song | .................... H04L 63/101 |

FOREIGN PATENT DOCUMENTS

| | | |
|---|---|---|
| JP | 201759964 | 3/2017 |
| WO | WO 2015141560 | 9/2015 |

* cited by examiner

Fig. 4

```
{
  "type": "C2",
  "id": "indicator--5a0b9763-e082-4618-b591-335e892a88b5",
  "created": "2017-12-30T08:50:45.814341Z",
  "name": "Access to C & C server",
  "pattern": "[ipv4-addr:value = '185.7.151.29/32' OR FQDN:value = 'c2.sample.jp]",
}
```

Fig. 5

| TIME | REQUEST SOURCE | FQDN | IP ADDRESS |
| --- | --- | --- | --- |
| 27-Dec-2017 04:13:35.940 | 182.44.13.87#28846 | c2.sample.jp | 185.7.32.51 |
| ... | ... | ... | ... |
| 29-Dec-2017 01:05:56.580 | 19.16.111.13#38846 | c2.sample.jp | 185.7.151.29 |
| ... | ... | ... | ... |

Fig. 6

| Date flow start | Duration | Proto | Src IP Addr | Src Port | Dst IP Addr | Dst Port | Packets | Bytes | Flows |
|---|---|---|---|---|---|---|---|---|---|
| 2017-12-27 04:13:36.687 | 2087.866 | TCP | 182.44.13.87 | 1108 | 185.7.32.51 | 6660 | 2 | 201 | 1 |
| ... | ... | ... | ... | ... | ... | ... | ... | ... | ... |
| 2017-12-29 01:05:56.912 | 3315.144 | TCP | 19.16.111.13 | 32011 | 185.7.151.29 | 6660 | 1 | 93 | 1 |
| 2017-12-29 01:35:56.355 | 2615.144 | TCP | 124.60.44.6 | 36344 | 185.7.151.29 | 6660 | 1 | 93 | 1 |
| 2017-12-29 01:35:56.889 | 1820.401 | TCP | 124.60.44.6 | 11021 | 81.33.52.195 | 80 | 20 | 4870 | 1 |
| ... | ... | ... | ... | ... | ... | ... | ... | ... | ... |

Fig. 7

| IP Addr | Bytes | Bytes_src | Duration | Duration_src | #Partner | #Partner_src |
|---|---|---|---|---|---|---|
| 182.44.13.87 | 201 | Flow | 2087.866 | Flow | 1 | Flow |
| 185.7.32.51 | 18602 | Flow | 281313.384 | Flow | 121 | Flow |
| 19.16.111.13 | 93 | Flow | 3315.144 | Flow | 1 | Flow |
| 185.7.151.29 | 5798 | Flow | 85309.855 | Flow | 3719 | DNS |
| 124.60.44.6 | 4963 | Flow | 4435.545 | Flow | 2 | Flow |
| 81.33.52.195 | 987042 | Flow | 195820.401 | Flow | 381 | Flow |
| ... | ... | ... | ... | ... | ... | ... |

Fig. 8

| IP Addr | AVERAGE COMMUNICATION TIME | AVERAGE BIT RATE | NUMBER OF COMMUNICATION DESTINATIONS |
|---|---|---|---|
| 182.44.13.87 | 2087.866 | 770.2 | 1 |
| 185.7.32.51 | 2324.904 | 529.0 | 12100 |
| 19.16.111.13 | 3315.144 | 224.4 | 1 |
| 185.7.151.29 | 2293.892 | 543.7 | 3719 |
| 124.60.44.6 | 2217.773 | 895.1 | 200 |
| 81.33.52.195 | 513.963 | 40328.1 | 38100 |
| 185.7.31.27 | 2279.375 | 526.8 | 10300 |
| ... | ... | ... | ... |

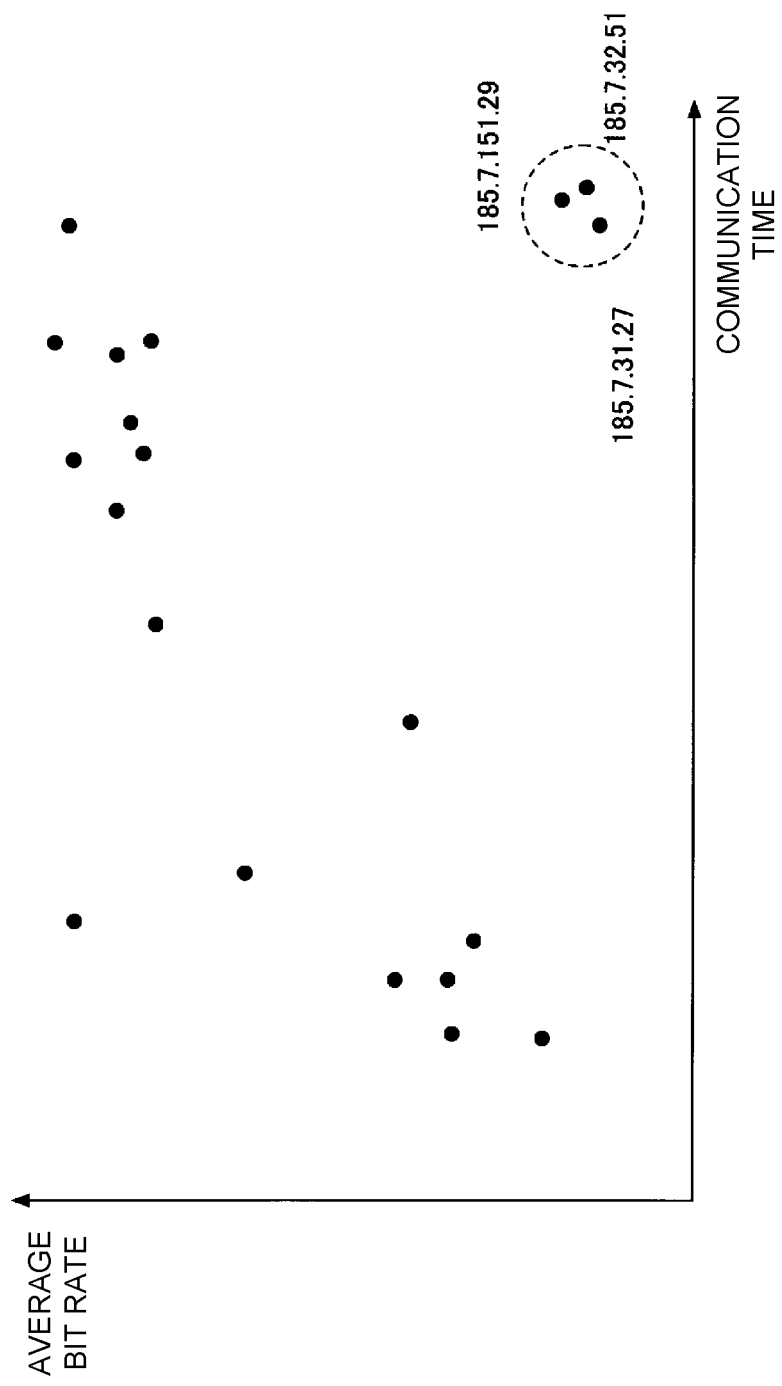

Fig. 10

```
{
  "type": "C2",
  "id": "indicator--5a0b9763-e082-4618-b591-335e892a88b5",
  "created": "2017-12-30T08:50:45.814341Z",
  "name": "Access to C & C server",
  "pattern": "[ipv4-addr:value = '185.7.151.29/32' OR FQDN:value = 'c2.sample.jp' OR ipv4-addr:value = '185.7.32.51/32' OR ipv4-addr:value = '185.7.31.27/32' ]",
  "number_observed": 26119,
}
{
  "type": "sighting",
  "id": "sighting--9238239c-e1f0-4fcc-910e-4d2afbc00b90",
  "created_by_ref": "identity--f8061be9-68d8-4215-92da-0b8e3c04e14a",
  "updated": "2017-12-31T12:20:56.015120Z",
  "count": 6211991,
  "sighting_of_ref": "indicator--5a0b9763-e082-4618-b591-335e892a88b5",
  "observed_data_refs": [
    "observed-data--a18d7db0-1e5d-41ba-b539-b3883d3e4b94"
  ]
}
```

THREAT INFORMATION EXTRACTION APPARATUS AND THREAT INFORMATION EXTRACTION SYSTEM

CROSS-REFERENCE TO RELATED APPLICATIONS

This application is a National Stage application under 35 U.S.C. § 371 of International Application No. PCT/JP2019/004586, having an International Filing Date of Feb. 8, 2019, which claims priority to Japanese Application Serial No. 2018-025426, filed on Feb. 15, 2018. The disclosure of the prior application is considered part of the disclosure of this application, and is incorporated in its entirety into this application.

TECHNICAL FIELD

The present invention relates to extraction of threat information necessary to detect/respond to cyber attacks, and more particularly, to a system and a device for extracting threat information by analyzing information that can be acquired from devices on a network.

BACKGROUND ART

As existing techniques for extracting threat information, Patent Literature 1 describes a technique for extracting threat information by observing behavior such as communication of malware used for attacks and Patent Literature 2 describes a technique for analyzing suspicious traffic logs on a network and extracting characteristic communication patterns as threat information.

According to Patent Literature 1, malware is caused to actually operate on a virtual machine isolated from surroundings and threat information is thereby extracted. For example, it is possible to capture communication with a C2 (Command and Control) server or the like that controls malware and extract threat information such as an IP address of the C2 server, FQDN (Fully Qualified Domain Name) and URL (Uniform Resource Locator). It is also possible to obtain files and inputs/outputs to/from registry in a host to thereby extract threat information about what kinds of files and registry keys are generated.

According to Patent Literature 2, when information such as character strings included in a URL is obtained to discover attack communication, it is possible to extract logs suspected to be attack communication from traffic logs such as proxy logs using the information, carefully examine traffics particularly suspected to be attacks among such logs using machine learning techniques or the like while utilizing payload information as well to thereby extract threat information from the examined traffics.

Citation List

Patent Literature

Patent Literature 1: Japanese Patent Laid-Open No. 2009-181335
Patent Literature 2: International Publication No. WO2015/141560

SUMMARY OF THE INVENTION

Technical Problem

According to Patent Literature 1, threat information unrelated to malware is difficult to extract as a matter of fact. Some kinds of threat information are still difficult to extract even though they are related to malware. One example is extraction of threat information concerning macro malware behavior, which is not confined within a single host, including which host on a network is infected with malware or what is the scale of infection. Another example is to exhaustively extract threat information such as all IP (Internet Protocol) addresses of C2 servers, a plurality of which are provided for ordinary attacks. Even if malware is observed as a black box, it is extremely difficult to exhaustively observe related behavior about all malware codes, and it is likewise difficult to exhaustively extract communication destinations or the like.

According to Patent Literature 2, a payload analysis is involved to extract attack communication using character strings or the like included in URLs. It is therefore difficult to apply the technique described in Patent Literature 2 to a network such as a carrier network for which a situation in which communication is encrypted by SSL (Secure Sockets Layer) or the like is assumed. The application for the carrier network is also difficult even when scalability is taken into account.

In view of the above-described problems, an object of the present invention is to provide a technique for extending threat information and/or generating new threat information by analyzing packet headers flowing through a network using threat information obtained by an analysis of malware behavior or the like.

Means for Solving the Problem

In order to attain the above-described object, an aspect of the present invention relates to a threat information extraction device provided with a network information DB that stores flow information and a threat information extraction unit that extracts new threat information from acquired threat information using the flow information, in which the threat information extraction unit extracts a first IP address from the acquired threat information, creates totalization information on the first IP address from the flow information, estimates a feature value of communication associated with the first IP address from the totalization information, and extracts zero or one or more other IP addresses similar to the first IP address at which communication is in progress based on the estimated feature value and generates threat information.

Effects of the Invention

According to the present invention, it is possible to extend threat information and/or generate new threat information by analyzing packet headers flowing through a network using threat information obtained by analyzing malware behavior or the like.

BRIEF DESCRIPTION OF DRAWINGS

FIG. 4 is a diagram illustrating an example of threat information according to the embodiment of the present invention.

FIG. 5 is a diagram illustrating an example of a table for managing query logs according to the embodiment of the present invention.

FIG. 6 is a diagram illustrating an example of a table for managing flow information according to the embodiment of the present invention.

FIG. 7 is a diagram illustrating an example of traffic totalization processing results according to the embodiment of the present invention.

FIG. 8 is a diagram illustrating an example of feature extraction results of a host according to the embodiment of the present invention.

FIG. 9 is a diagram illustrating an example of IP address clustering results based on a communication situation according to the embodiment of the present invention.

FIG. 10 is a diagram illustrating an example of output of the threat information extraction device according to the embodiment of the present invention.

DETAILED DESCRIPTION OF THE INVENTION

Hereinafter, embodiments of the present invention will be described based on the accompanying drawings.

As an example of an application form of the present invention, operation of each function will be described using an example where a network provider receives information on C2 servers from outside, extracts information for identifying an undetected C2 server and information on the scale of a botnet relating to those C2 servers and an activity situation or the like based on the information obtained from a network operated by the provider and transmits the information to the outside. However, the application form of the present invention is not limited to this.

Figure 1:
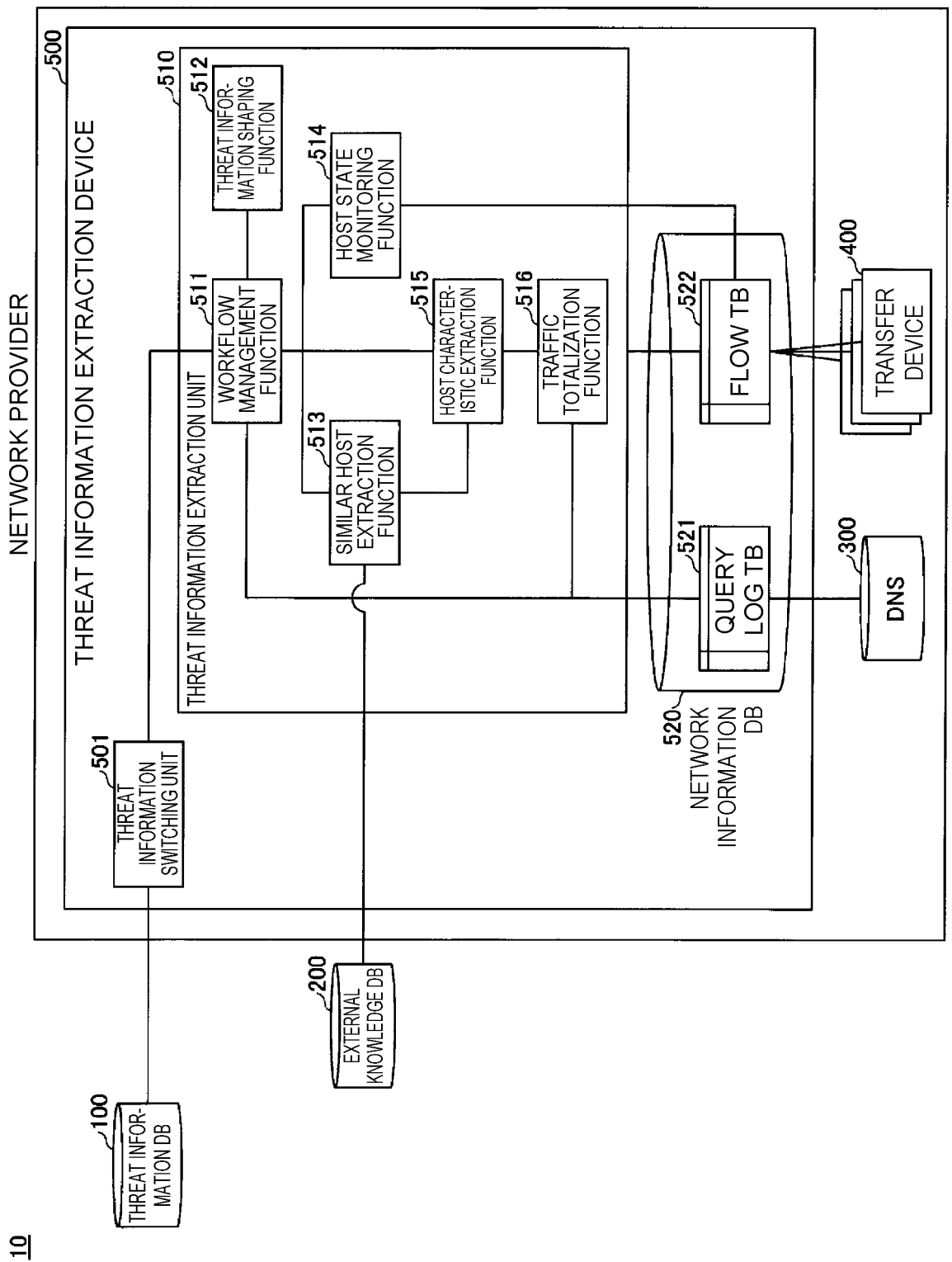
FIG. 1 is a configuration diagram illustrating a threat information extraction system according to an embodiment of the present invention.

FIG. 1 is a configuration diagram illustrating a threat information extraction system according to an embodiment of the present invention. As shown in FIG. 1, a threat information extraction system 10 includes a threat information DB 100 used by a network provider or an outside expert or the like to share threat information, an external knowledge DB 200 that manages evaluations on resources on the Internet such as IP addresses and FQDNs, a DNS 300 that manages/provides correspondence between FQDNs and IP addresses managed by the network provider or the like, a transfer device 400 that constitutes the network and a threat information extraction device 500 that analyzes information from the DBs and devices, and generates new threat information.

Figure 2:
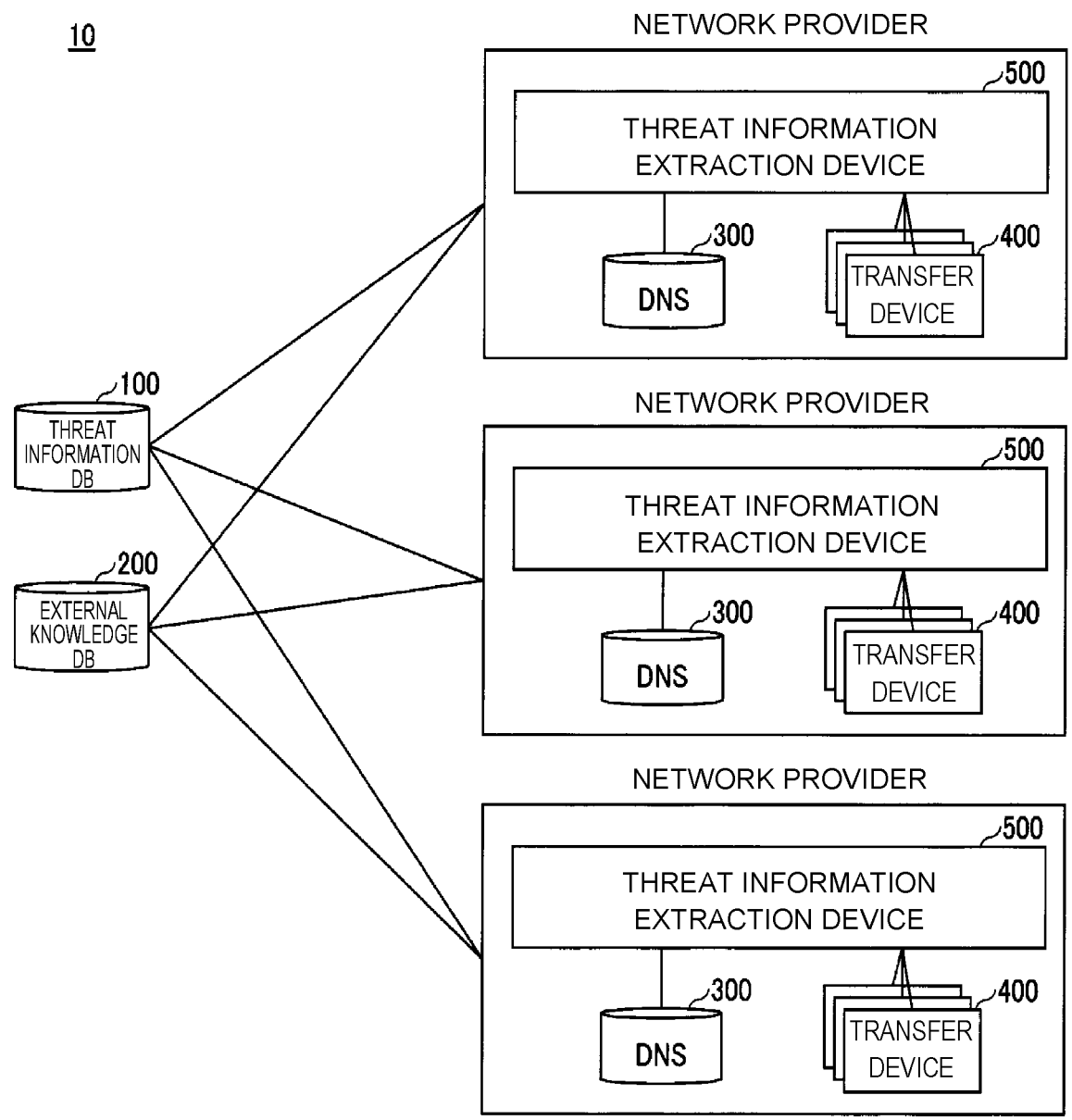
FIG. 2 is a configuration diagram illustrating a threat information extraction system according to another embodiment of the present invention.
Figure 3:
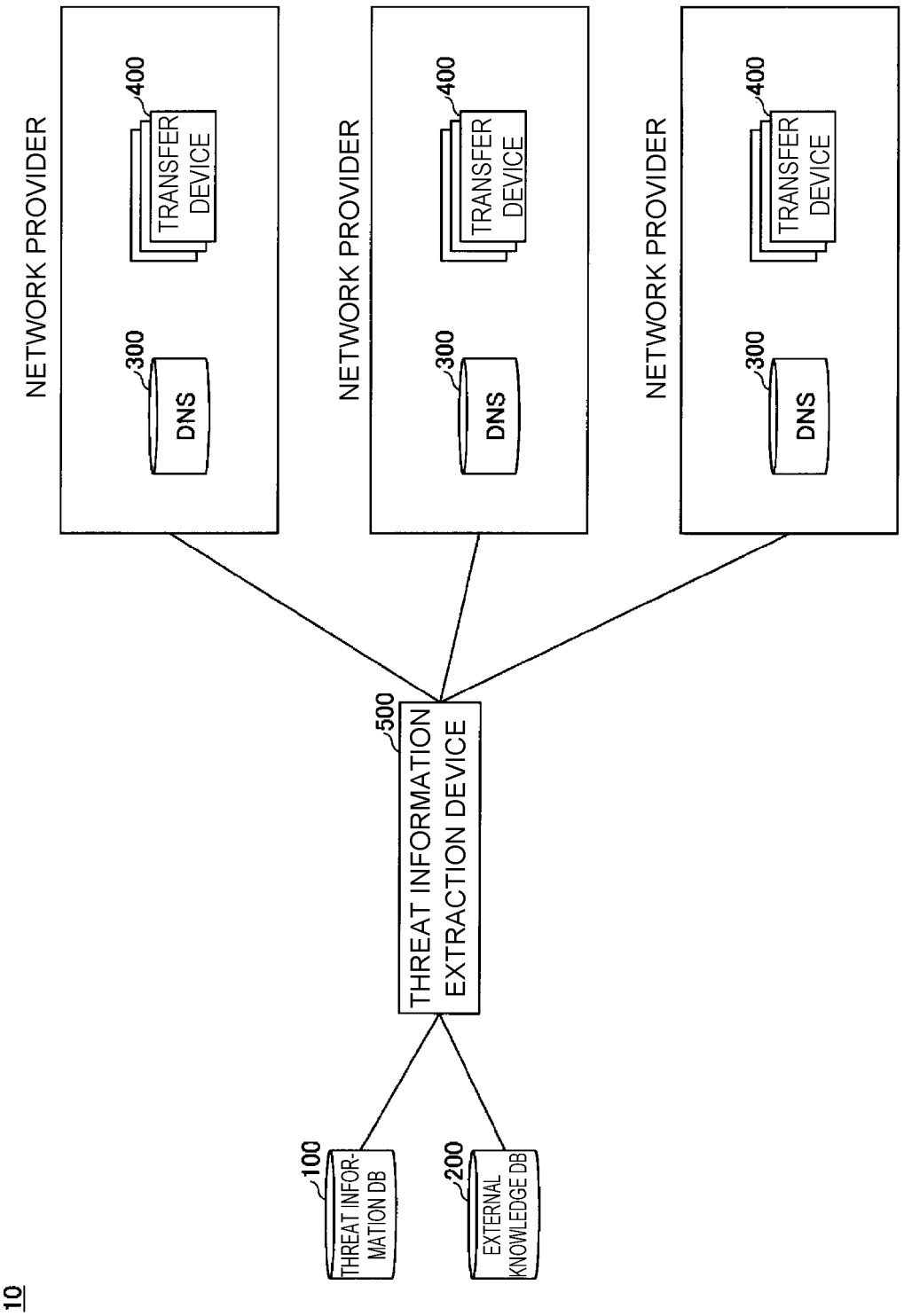
FIG. 3 is a configuration diagram illustrating a threat information extraction system according to a further embodiment of the present invention.

Note that the number of network providers included in the threat information extraction system 10 need not be limited to one, but as shown in FIG. 2, a plurality of network providers may be connected to one threat information DB 100. Furthermore, the threat information extraction device 500, the DNS 300 and the transfer device 400 may not necessarily be managed by the same network provider, but as shown in FIG. 3, the threat information extraction device 500 exists in the form of not belonging to a specific network provider and may adopt a form in which the DNS 300 and the transfer device 400 of a plurality of network providers are connected to the threat information extraction device 500. However, a form will be described in the following embodiment as shown in FIG. 1, for convenience of description, in which one network provider who possesses one DNS 300, one transfer device 400 and one threat information extraction device 500 is connected to one threat information DB 100 and one external knowledge DB 200.

Next, definitions of the respective devices and related terms will be summarized. A functional configuration of the threat information extraction device 500 in particular will be described using FIG. 1.

The threat information DB 100 is a device that manages information on cyber threat (hereinafter, "threat information"). For example, the threat information DB 100 may be installed so as to be accessible or available to any specific person, organization or anybody on the Internet and information on cyber threat can be shared among users and organizations.

Here, the threat information refers to information on an attacker related to cyber threat, aim of the attack, attacking technique or information for detecting the attack generated (hereinafter, "signature") or the like. Note that regarding a description format of threat information, description in free text assumed to be read/written mainly by humans and structured formats such as STIX (Structured Threat Information eXpression) assumed to be interpreted by a program or the like exist.

In the present embodiment, the threat information managed by the threat information DB 100 is structured, and will be described assuming that a URL and an IP address of the C2 server are included as shown in FIG. 4 as an actual example of signature.

The external knowledge DB 200 is intended to manage information as to whether a server or the like indicated by the IP address or URL/FQDN is malignant or not. For example, the external knowledge DB 200 may be installed on the Internet and may be released with or without charging.

The DNS 300 is a device that manages correspondence between an FQDN and an IP address and receives a request for conversion mainly from an FQDN to an IP address (hereinafter referred to as "address solution"). Typically, the DNS 300 is installed on the Internet or within a network run by a network provider and each DNS 300 is supplied with an address solution function, each in the form of being released on the Internet or for users of the network service of the network provider. An example will be described in the present embodiment where the network provider installs the DNS 300 for users of the network provider's own network service.

Upon receiving an address solution request from a network service user, the DNS 300 generates a log including a source IP address of the address solution request, the queried FQDN and/or the corresponding IP address and stores the log as a query log.

The transfer device 400 is a device that constitutes the network of the network provider and has a function of transferring a packet associated with communication of the service user based on the IP address or the like of the destination. The transfer device 400 has a function for the network provider to transmit a communication situation to the outside for the purpose of grasping a network situation or the like. The information transmitted to the outside (hereinafter, "flow information") includes the IP address and the port number of the communication source, the IP address or the port number of the communication destination, a communication amount for each communication protocol (hereinafter for every "five tuples") or the like. Although there are a plurality of standards such as NetFlow regarding contents and format of flow information and transmission method, which standard is to be used does not matter in the present embodiment as long the aforementioned six pieces of information are included. Note that regarding the flow information generated or transmitted by the transfer device 400, in view of network scalability, it is assumed that instead of the flow information being generated or transmitted about all the packets transferred by the transfer device 400, the flow information is generated or transmitted for one out of a predetermined number of (hereinafter, "sampling rate") packets. Without being limited, however, the sampling rate is set to 100 in the present embodiment.

The threat information extraction device 500 is constructed of a threat information switching unit 501, a network information DB 520 and a threat information extraction unit 510. The threat information switching unit 501 gives/receives threat information to/from the threat information DB 100. The network information DB 520 manages the query log or the flow information received/collected from the DNS 300 or the transfer device 400. The threat information extraction unit 510 cross-sectionally analyzes the threat information received from the threat information DB 100, and the query log or the flow information managed by the network information DB 520 and thereby generates/extracts new threat information.

The threat information extraction unit 510 extracts similarity and a state of a terminal or the like (hereinafter, "host") connected to the network from the query log and the flow information. In the embodiment, the threat information extraction unit 510 includes a workflow management function 511, a threat information shaping function 512, a similar host extraction function 513, a host state monitoring function 514, a host characteristic extraction function 515 and a traffic totalization function 516.

The workflow management function 511 controls the analysis technique or the like to be implemented based on the type of the threat information received by the threat information switching unit 501.

The threat information shaping function 512 analyzes the structured threat information, extracts necessary information and executes processing associated with structuring of threat information such as shaping of the threat information generated using the query log and the flow information or the like into a structured format.

The similar host extraction function 513 analyzes the similarity of the host from communication characteristics using the output of the host characteristic extraction function 515, compares the similarity with the threat information acquired by the threat information switching unit 501 and thereby extracts the IP address or the like of an unknown C2 server.

The host state monitoring function 514 monitors a communication state of the host specified by the acquired threat information and extracts a change in activation or the like of a botnet.

The host characteristic extraction function 515 estimates information, which cannot be obtained by simple totalization processing by taking into account a sampling rate of flow information generation for information to be generated by the traffic totalization function 516 or selects information appropriate for the similar host extraction function 513, which will be described later.

The traffic totalization function 516 calculates/manages information obtained by basic totalization such as a communication time and a communication amount for each host based on the flow information received from the network information DB 520.

The network information DB 520 is constructed of a query log TB 521 that manages query logs and a flow TB 522 that manages flow information.

Here, the threat information extraction device 500 may also typically be implemented by a server and is constructed of, for example, a drive device, an auxiliary storage device, a memory device, a processor, an interface device and a communication device, which are mutually connected via a bus. Various computer programs including a program for implementing various function and processes of the threat information extraction device 500, which will be described later, may be provided in a recording medium such as CD-ROM (Compact Disk-Read Only Memory), DVD (Digital Versatile Disk) or flash memory. When a recording medium storing a program is set in a drive device, the program is installed in an auxiliary storage device from the recording medium via the drive device. However, the program need not always be installed using the recording medium, but may also be downloaded from any external device via a network or the like. The auxiliary storage device stores not only the installed program but also necessary files and data or the like. Upon receiving an instruction for starting the program, the memory device reads the program or data from the auxiliary storage device and stores the program or data. The processor executes various functions and processes of the threat information extraction device 500, which will be described later, according to the program stored in the memory device and various data such as parameters necessary to execute the program. The interface device is used as a communication interface for connection with a network or an external device. The communication device executes various communication processes to communicate with a network such as the Internet.

However, the threat information extraction device 500 is not limited to the aforementioned hardware configuration, but may also be implemented in any other appropriate hardware configuration.

When a new IP address of the C2 server is registered with the threat information DB 100, a flow will be described hereinafter; the flow for the threat information extraction device 500 to extract an IP address of a host having a similar communication pattern or the like, the scale of a related botnet and their states using flow information and query logs of the network and add threat information to the threat information DB 100.

First, when an attacker or the like installs a plurality of C2 servers somewhere on the Internet and a host infected with malware and converted into a bot starts steady communication with one or a plurality of those C2 servers. Analysts on the Internet may identify an IP address or FQDN of one of the C2 servers using the technique or the like described in Patent Literature 1 and the IP address or FQDN may be registered with the threat information DB 100 as shown in FIG. 4.

In this case, along with communication from the botted host to the C2 server, an address solution request concerning the FQDN of the C2 server arrives at the DNS 300, a corresponding query log is generated and the transfer device 400 generates flow information along with the steady communication. The query log and flow information generated are sent to the network information DB 520 in the threat information extraction device 500 and stored in the query log table (TB) 521 and the flow table (TB) 522 respectively for a predetermined period.

For example, the query log TB 521 may manage query logs using the table as shown in FIG. 5 and store transmission or reception time of the query log, the IP address of a request source, FQDN, the IP address of the return destination or the like about each query log. The flow TB 522 may manage flow information using a table shown in FIG. 6 and store the flow start date and time, period, protocol, source IP address, source port, destination IP address, destination port, the number of packets, the number of bytes, the number of flows or the like for each flow.

Here, although an information storage period for the query log TB 521 and the flow TB 522 depends on a storage capacity of the network information DB 520, without being limited to this, it is possible to store query logs or flow information by deleting the query logs or flow information from the old information at a stage in which storage usage exceeds a threshold based on a threshold set in advance until the storage usage falls below the threshold and by repeating such a process.

After threat information is registered with the threat information DB 100, the threat information switching unit 501 in the threat information extraction device 500 of the network provider acquires the registered threat information from the threat information DB 100. As a protocol used to acquire the threat information, a protocol based on a standard such as TAXII (Trusted Automated eXchange of Indicator Information) may be used or an independent API (Application Programming Interface) may be used. Regarding acquisition of threat information, the threat information switching unit 501 may periodically query the threat information DB 100 for new information or assume the form of notifying new information from the threat information DB 100.

The threat information acquired by the threat information switching unit 501 is received by the workflow management function 511, and the threat information shaping function 512 executes an analysis process. The threat information shaping function 512 analyzes, for example, a syntax of the received threat information and extracts the fact that the C2 server is identified as the type of threat information, that 185.7.151.29/32 is confirmed as the IP address and that c2.sample.jp is confirmed as the FQDN, and delivers the information to the workflow management function 511.

Since the type of threat information is C2, the workflow management function 511 starts controlling various functions so as to execute the following four processes. A first process is acquisition of an IP address corresponding to the FQDN, a second process is extraction of an IP address of a similar host using the similar host extraction function 513, a third process is extraction of the scale of a botnet using the host characteristic extraction function 515 and a fourth process is continuous monitoring of related communication using the host state monitoring function 514. Note that operation of the workflow management function 511 is not limited to this, but the workflow management function 511 can perform processing corresponding to the type of threat information by describing a scenario, and when, for example, the type of threat information is an IP watchlist, it is possible to make a change so that only extraction of a similar host is executed.

When acquiring the IP address corresponding to the FQDN, the workflow management function 511 not only sends an address solution request to the DNS 300, but also references contents of the query log TB 521 and extracts the IP address actually sent back to c2.sample.jp including not only a period currently set but also a past period set in advance. In the present embodiment, the fact that 185.7.32.51/32 in addition to 185.7.151.29/32 corresponds to c2.sample.jp is extracted and analyses of the two IP addresses are executed for the remaining three processes.

Operations of the similar host extraction function 513, the host characteristic extraction function 515 and the host response monitoring function 514 will be described using a flow example of the following processes concerning an analysis of query log/flow information starting with the process of the traffic totalization function 516.

The traffic totalization function 516 performs re-totalization in order to analyze similarity of a host about a communication amount for every five tuples managed by the flow TB 522 shown in FIG. 6. For example, a technique of performing totalization for each of three pieces of information of an IP address, a port and a protocol of the transfer destination and performing totalization about a received packet can also be considered, but in the present embodiment, the traffic totalization function 516 performs totalization about a communication amount, communication time and/or the number of communication destinations for each IP address without distinguishing the transfer destination and transfer source. Furthermore, the traffic totalization function 516 totalizes the number of IP addresses of address solution request sources for each IP address after address solution from query log information managed by the query log TB 521 as shown in FIG. 5, and thereby totalizes the number of communication destinations about each IP address. Note that when the number of communication destinations is acquired for each IP address from both the query log TB 521 and the flow TB 522, a total value obtained from the query log TB 521 may be used or a totalization result from the query log or a totalization result from the flow information may be described together as the totalization result. The above-described totalization results are as shown, for example, in FIG. 7 and the information is transmitted to the host characteristic extraction function 515.

The host characteristic extraction function 515 corrects various totalization values using the information received from the traffic totalization function 516 and the sampling rate (e.g., 100) at the time of flow generation and generates a characteristic value such that host differences can be identified in the process of the similar host extraction function 513.

More specifically, first, regarding the correction of a totalization value in the host characteristic extraction function 515, since the totalization value from the flow information is assumed to have decreased by the number of pieces of information sampled, the host characteristic extraction function 515 performs correction by multiplying the totalization value by the sampling rate (e.g., 100). However, regarding the number of communication destinations, when the number of communication destinations is small, a large error may be generated, and therefore no correction is made if the value before correction is smaller than a threshold set in advance. In the present embodiment, the threshold is assumed to be 2.

Next, regarding generation of feature values in the host characteristic extraction function 515, assuming that communication between the C2 server and a bot is basically carried out at a low bit rate for a long period of time, the host characteristic extraction function 515 outputs an average communication time and an average bit rate in the present embodiment. More specifically, the host characteristic extraction function 515 estimates and outputs the average bit rate and the average communication time by dividing the corrected communication amount by a communication time and by dividing the communication time by the number of communication destinations respectively.

FIG. 8 shows an example of information generated by the host characteristic extraction function 515. Of the information generated in this way, the number of communication destinations for each IP address is estimated to be the scale of a botnet when the IP address is a C2 server. Therefore, in the illustrated example, when IP addresses 185.7.151.29 and 185.7.32.51 of the C2 server are received from the workflow management function 511, the host characteristic extraction function 515 responds indicating that the scales of the respective botnets are 3719 and 12100. Other values such as the average communication time and the average bit rate are transmitted to the similar host extraction function 513.

The similar host extraction function 513 extracts IP addresses similar to the IP addresses 185.7.151.29 and 185.7.32.51 of the C2 server received from the workflow management function 511 at which communication is in progress based on the average communication time and the average bit rate for each IP address received from the host characteristic extraction function 515 and sends back the IP addresses to the workflow management function 511. As a specific example of the extraction method, only IPs, the number of communication destinations of which is 1000 or the like, which is larger than a value set in advance are extracted, the IP addresses are subjected to clustering using a k-means method or the like using the average communication time and the average bit rate as feature values, and IP addresses belonging to the same cluster as the cluster of the IP addresses 185.7.151.29 and 185.7.32.51 of the C2 server are extracted as similar IP addresses as 185.7.31.27 or the like. FIG. 9 shows an example of the IP address group described in FIG. 8 subjected to clustering. Note that although clustering is performed based on only two pieces of information in the present embodiment, the present embodiment does not limit the number of pieces of information to 2, but other information such as the number of communication destinations may also be clustered together.

The workflow management function 511 receives IP address 185.7.31.27 at which communication is carried out, similar to the communication of the C2 server is received from the similar host extraction function 513, and recognizes the scale of the botnets as 3719, 12100 and 10300 from the host characteristic extraction function 515 about three IP addresses (185.7.151.29, 185.7.32.51 and 185.7.31.27) in addition to the IP address in question. Among these IP addresses, regarding the botnet of larger scale than a threshold set in advance, for example, 10000, the workflow management function 511 transmits the IP addresses (185.7.32.51 and 185.7.31.27) to the host state monitoring function 514 to monitor the occurrence of an attack operation or the like and asks the host state monitoring function 514 for monitoring.

Regarding the notified IP addresses (185.7.32.51 and 185.7.31.27), the host state monitoring function 514 starts monitoring the communication in order to detect the occurrence of an abnormality. Examples of communication monitoring may include a method of continuously acquiring flow information for each specified IP address and monitoring whether each acquired value exceeds a threshold or not or a technique of causing an auto-encoder which inputs/outputs each value to learn normal states, inputting each value of flow information and assuming that it is an abnormality when the output increases. When abnormalities are detected using these techniques, the host state monitoring function 514 notifies the workflow management function 511 of IP addresses at which abnormalities are detected.

The workflow management function 511 receives an IP address suspected to be the IP address of the C2 server from the similar host extraction function 513, the scale of a botnet related to each C2 server, in addition to the IP address, from the host characteristic extraction function 515 and a change in communication of the C2 server from the host state monitoring function 514, and transmits them as threat information structured as shown in FIG. 10 by the threat information shaping function 512 to the threat information switching unit 501. The threat information switching unit 501 that has received the threat information registers the threat information with the threat information DB 100.

As described above, according to the threat information extraction system 10 of the present embodiment, it is possible to generate threat information including threat information related to exhaustive/unknown threat, which cannot be obtained only by a malware code/behavior analysis by generating new threat information using the information on the DNS 300 of the network and the transfer device 400 and enable earlier, more accurate, more exhaustive detection and responses.

Although the embodiments of the present invention have been described in detail so far, the present invention is not limited to the aforementioned specific embodiments, but various modifications and changes can be made without departing from the spirit and scope of the present invention described in the appended claims.

REFERENCE SIGNS LIST 10 threat information extraction system
100 threat information DB
200 external knowledge DB
300 DNS
400 transfer device
500 threat information extraction device
501 threat information switching unit
510 threat information extraction unit
511 workflow management function
512 threat information shaping function
513 similar host extraction function
514 host state monitoring function
515 host characteristic extraction function
516 traffic totalization function
520 network information DB
521 query log TB
522 flow TB

The invention claimed is:

1. A threat information extraction device comprising a processor; and a memory device storing instructions that, when executed by the processor, cause the processor to perform operations comprising:

storing flow information; and extracting new threat information from acquired threat information using the flow information, wherein extracting the new threat information comprises:

extracting a first Internet Protocol (IP) address from the acquired threat information, creating totalization information on the first IP address from the flow information;

estimating a feature value of communication associated with the first IP address from the totalization information, wherein the feature value comprises an average bit rate and an average communication time of communication associated with the first IP address; and extracting zero or one or more other IP addresses that are similar to the first IP address at which communication is in progress using a clustering method based on the estimated feature value comprising the average bit rate and the average communication time of communication associated with each respective IP address, wherein the average bit rate is estimated by dividing a corrected communication amount of each host by a communication time of each host and the average communication time is estimated by dividing the communication time by a number of communication destinations;
determining one or more target IP addresses, included in the first IP address and the other IP addresses, whose respective number of the communication destinations is equal to or larger than a predetermined threshold for a number of communication destinations;
monitoring communications associated with the one or more target IP addresses to detect an abnormality based on the flow information at the one or more target IP addresses; and
generating threat information for the one or more target IP addresses.

2. A threat information extraction device comprising a processor; and a memory device storing instructions that, when executed by the processor, cause the processor to perform operations comprising:
storing query logs and flow information; and
extracting new threat information from acquired threat information using the query logs and the flow information, wherein extracting the new threat information comprises: extracting a first IP address and a Fully Qualified Domain Name (FQDN) of a Command and Control (C2) server from the acquired threat information,
extracting a second IP address sent back to the FQDN extracted from the query logs,
creating totalization information on the first IP address and the second IP address from the flow information,
estimating a feature value of communication associated with the first IP address and the second IP address from the totalization information, wherein the feature value comprises an average bit rate and an average communication time of communication associated with the first IP address, and
extracting zero or one or more other IP addresses that are similar to the first IP address and the second IP address at which communication is in progress using a clustering method based on the estimated feature value comprising the average bit rate and the average communication time of communication associated with each respective IP address, wherein the average bit rate is estimated by dividing a corrected communication amount of each host by a communication time of each host and the average communication time is estimated by dividing the communication time by a number of communication destinations;
determining one or more target IP addresses, included in the first IP address, the second IP address, and the other IP addresses, whose respective number of communication destinations is equal to or larger than a predetermined threshold for a number of communication destinations, monitoring communications associated with the one or more target IP addresses to detect an abnormality based on the flow information at the one or more target IP addresses, and generating threat information for the one or more target IP addresses.

3. The threat information extraction device according to claim 2, wherein the flow information comprises at least a protocol of each flow, a source IP address, a source port, a destination IP address, a destination port and a communication amount.

4. The threat information extraction device according to claim 2, wherein the query logs at least comprise a request source IP address, an FQDN and an IP address of a return destination.

5. The threat information extraction device according to claim 2, wherein the totalization information comprises at least the number of communication destinations of the first IP address or the second IP address.

6. The threat information extraction device according to claim 2, wherein the respective number of communication destinations of the one or more target IP addresses indicates a scale of a botnet of the one or more target IP addresses.

7. A threat information extraction system comprising: a threat information extraction device; and a threat information database (DB) configured to store threat information extracted by the threat information extraction device, wherein the threat information extraction device comprises a processor; and a memory device storing instructions that, when executed by the processor, cause the processor to perform operations comprising:
storing flow information; and extracting new threat information from acquired threat information using the flow information, wherein extracting the new threat information comprises:
extracting a first Internet Protocol (IP) address from the acquired threat information,
creating totalization information on the first IP address from the flow information,
estimating a feature value of communication associated with the first IP address from the totalization information, wherein the feature value comprises an average bit rate and an average communication time of communication associated with the first IP address, and extracting zero or one or more other IP addresses that are similar to the first IP address at which communication is in progress using a clustering method based on the estimated feature value comprising the average bit rate and the average communication time of communication associated with each respective IP address, wherein the average bit rate is estimated by dividing a corrected communication amount of each host by a communication time of each host and the average communication time is estimated by dividing the communication time by a number of communication destinations;
determining one or more target IP addresses, included in the first IP address and the other IP addresses, whose respective number of communication destinations is equal to or larger than a predetermined threshold for a number of communication destinations,
monitoring communications associated with the one or more target IP addresses to detect an abnormality based on the flow information at the one or more target IP addresses, and generating threat information for the one or more target IP addresses.

8. The threat information extraction device according to claim 1, wherein the flow information comprises at least a protocol of each flow, a source IP address, a source port, a destination IP address, a destination port and a communication amount.

9. The threat information extraction device according to claim 1, wherein the totalization information comprises at least the number of communication destinations of the first IP address.

10. The threat information extraction device according to claim 1, wherein the respective number of communication destinations of the one or more target IP addresses indicates a scale of a botnet of the one or more target IP addresses.

11. The threat information extraction system according to claim 7, wherein the flow information comprises at least a protocol of each flow, a source IP address, a source port, a destination IP address, a destination port and a communication amount.

12. The threat information extraction system according to claim 7, wherein the totalization information comprises at least the number of communication destinations of the first IP address.

13. The threat information extraction system according to claim 7, wherein the respective number of communication destinations of the one or more target IP addresses indicates a scale of a botnet of the one or more target IP addresses.

* * * * *